May 27, 1969     P. T. BROOKS     3,446,720
PREPARATION OF HIGH-PURITY NICKEL AND COBALT
Filed Jan. 27, 1965
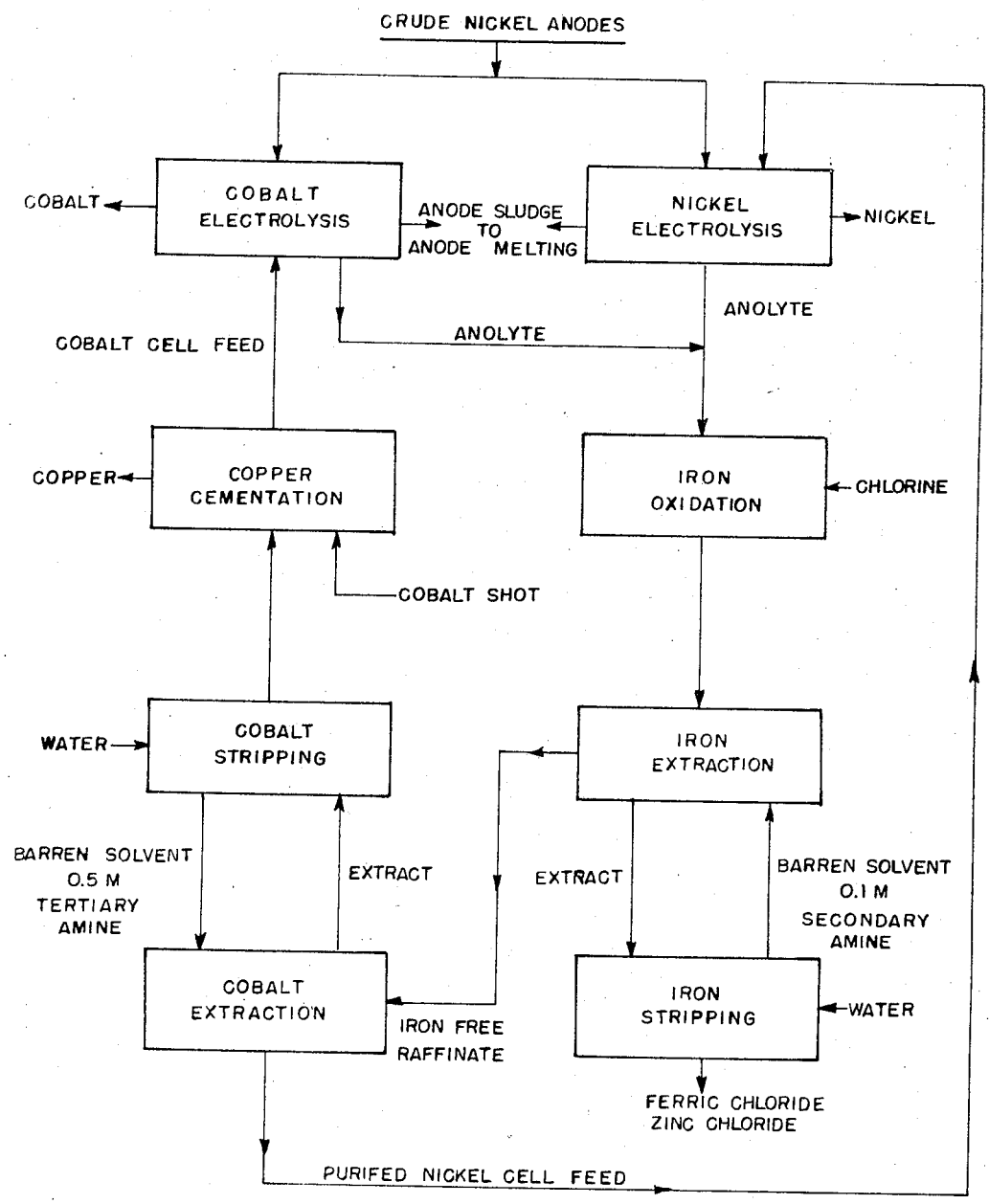
INVENTOR
PARKMAN T. BROOKS
ATTORNEYS

United States Patent Office 3,446,720
Patented May 27, 1969

3,446,720
**PREPARATION OF HIGH-PURITY
NICKEL AND COBALT**
Parkman T. Brooks, Salt Lake City, Utah, assignor to the United States of America as represented by the Secretary of the Interior
Filed Jan. 27, 1965, Ser. No. 428,585
Int. Cl. C22d 1/24, 1/14
U.S. Cl. 204—112                                    5 Claims

ABSTRACT OF THE DISCLOSURE

Separating iron and zinc impurities from an aqueous chloride solution, containing nickel and cobalt in addition to the impurities, by extracting said impurities with a water-immiscible secondary amine.

---

The invention herein described and claimed may be manufactured and used by or for the Government of the United States of America for governmental purposes without the payment of royalties thereon or therefor.

This invention is concerned with separation of metallic impurities from aqueous solutions of nickel and cobalt by solvent extraction.

The figure is a flowsheet of a process for recovery of high purity nickel and cobalt, by means of electrolysis and solvent extraction, in which the process of the invention is employed.

According to prior art procedures, commercial separation of iron impurity from solutions containing nickel and cobalt, such as nickel electro-refining electrolyte, was done by oxidation of the iron and precipitation as hydrated ferric oxide. This method, however, failed to give a complete separation of iron from the soltuion and was troublesome because of the poor filtration properties of the precipitate. In addition, the precipitate contained appreciable amounts of cobalt and nickel values that required further processing for recovery.

It is therefore an object of the present invention to provide a simple, economical and efficient process for separating iron and other metallic impurities, particularly zinc, from aqueous solutions of nickel and cobalt.

It has now been found that this objective may be achieved by means of a solvent extraction process in which iron and zinc impurities are extracted from an aqueous chloride solution containing the impurities in addition to nickel and cobalt. The extractant employed is a water-immiscible secondary amine and is used in solution in a water-immiscible organic diluent.

Dodecenyltrialkylmethyl amines having molecular weights in the range of 350 to 400 have been found to be very effective; however, other water-immiscible, secondary amines are nearly as effective and may be used in the invention. Molecular weights of these amines will generally vary from about 250 to 600. Specific examples of such amines are ditridecylamine and di-2-ethylhexylamine.

The primary purpose of the organic diluent is reduction of the viscosity of the organic phase to facilitate processing. It is usually relatively inert and may be chosen from any of the well known groups of water-immiscible organic diluents or solvents such as ketones, chlorinated hydrocarbons and aromatic and aliphatic hydrocarbons. An aromatic naphtha, having a flash point of 115° F., has proved to be a satisfactory diluent, as shown in the example below.

For effective separation of iron and zinc according to the process of the invention the aqueous feed must contain at least 100 and preferably 150 or more grams per liter of chloride. The optimum concentration of chloride will, of course, vary somewhat with the specific amine employed as well as the composition of the feed, type of diluent, amount of extractant, etc. Chloride may be supplied by salts such as sodium chloride, nickel chloride, etc. A part of the chloride may also be derived from hydrochloric acid additions used to maintain optimum pH values in the solution.

The aqueous feed may have a pH of about 4.5 but is preferably 3 or less. This is necessary to maintain the amine in the form of hydrochloride, the active extractant. However, excessive amounts of acid may tend to interfere with subsequent recovery of cobalt, copper, and nickel as described below. Generally the pH should not be less than about 1.0.

The presence of soluble sulfates such as sodium or nickel sulfate in the feed does not hinder extraction of impurities and may actually be a desirable constituent. For example, anolyte from electrolytic nickel operations, a typical impure nickel-bearing feed solution containing both sulfates and chlorides, constitutes good solvent extraction feed (see example below).

Prior to extraction according to the process of the invention, iron impurity must be oxidized to the ferric state. This is readily accomplished by treatment with gaseous chlorine. Other means of oxidation that may be used are aeration or use of hydrogen peroxide.

Optimum amounts of amine and diluent are best determined by an economic appraisal of the process since the optimum amounts vary with composition of feed, number of extraction stages employed and desired composition of the strip solutions. For example, iron extraction from chloride solutions increases with amine concentration in the diluent and thereby diminishes the number of extraction stages required to reduce the iron concentration in the raffinate to a given level. However, use of a solvent containing a high concentration of amine may not be advantageous since water stripping of iron from such a solvent may require more stages to produce an iron-free organic phase than similar treatment of iron-bearing solvent containing a lower amine concentration. Generally, volume ratios of amine to diluent will range from about $\frac{1}{20}$ to $\frac{1}{2}$ and volume ratios of solvent to aqueous solution will range from about $\frac{1}{5}$ to $\frac{5}{4}$.

The extraction and subsequent stripping operations may be effected by any of several well known techniques. Best results have been obtained by employing countercurrent flow of solvent and feed.

Following extraction, the metallic impurities are stripped from the extractant by means of multistage countercurrent contact with water. This gives an aqueous solution of the impurities, i.e., iron, zinc and traces of copper, and a barren organic phase satisfactory for recirculating and reuse in subsequent extraction operations.

Following application of applicant's process the purified aqueous solution containing nickel and cobalt may be further treated to separate these two metals. This separation is readily accomplished by means of extraction of the cobalt with a tertiary amine hydrochloride as described in Bureau of Mines Report of Investigations 6159. The cobalt-bearing solution from this second extraction step may be further treated to remove copper, as by cementation on cobalt metal granules, and the cobalt recovered either as a cobalt compound or as the metal by electrolysis. Nickel may also be recovered from the purified nickel-bearing solution as either a nickel compound or as the metal by electrolysis.

The invention will be more specificaly illustrated by means of the following example with reference to the figure.

EXAMPLE

Referring to the flowsheet of the figure, anolyte from an electro-refining operation was treated to separate cobalt, copper, iron, and zinc from nickel. This pH 1.4 solution contained, in grams per liter, 100 nickel, 1.9 cobalt, 0.010 copper, 0.14 iron, 0.010 zinc, 160 chloride, and 60 sulfate. The solution was oxidized with chlorine to convert ferrous iron to the extractable ferric state. Cuprous copper, if present, also was oxidized to cupric copper by this procedure. The solution was passed countercurrently through three mixer-settler extractors, using 0.2 molar dodecenyltrialkylmethyl amine hydrochloride dissolved in aromatic naphtha as the extractant. An aqueous-to-organic phase ratio of 2 was used. More than 95 percent of the iron and zinc, less than 0.001 percent of the cobalt and nickel, and 4 percent of the copper were extracted. The extract phase was then stripped countercurrently with water, using three mixer-settler units at an organic-to-aqueous phase ratio of 12. The barren organic phase was recycled to the solvent extraction operation without further treatment. The iron-rich strip solution contained, typically, in grams per liter, 3.3 iron, 0.17 zinc, 0.01 copper, 0.06 cobalt, and 0.008 nickel. The nickel-bearing solution, thus freed of iron and zinc, was passed countercurrently through a disk-type vertical extraction column equivalent to nearly five theoretical extraction stages, using 0.5 molar triisooctylamine hydrochloride dissolved in aromatic naphtha as the extractant. An aqueous-to-organic ratio of 1 was used. Better than 99 percent of the cobalt and copper were extracted from the nickel-bearing solution, which was then treated by electrolysis for recovery of high-purity nickel. The nickel plated from solution purified in this manner contained less than 100 parts per million of metallic impurities including in parts per million, 10 Pb, 10 Si, less than 10 Na, 5 Al, 5 As, 4 Mg, 4 Mo, 3 Fe, 1 Cu, and 0.2 Co. The organic extract stream from the mixer-settlers contained 1.9 grams per liter of cobalt, 0.01 gram per liter of copper, and less than 0.05 gram per liter of nickel. This was stripped countercurrently with water in eight mixer-settlers at an organic-to-aqueous phase ratio of 20 to give (1) a cobalt-free organic phase, and (2) a cobalt chloride solution containing 38 grams per liter of cobalt, 0.2 gram per liter copper, and 0.3 gram per liter of nickel. The barren organic phase, (1) above, was recycled to the cobalt extraction operation and the cobalt chloride strip solution was treated with cobalt metal to remove the copper by cementation. The decoppered solution was treated electrolytically for recovery of cobalt metal which contained, typically, less than 200 parts per million of metallic impurities including, in parts per million, 100 Cu, 29 Ni, 20 Zn, 18 Fe, and less than 10 Na.

What is claimed is:
1. A process for separating ferric iron and zinc from nickel and cobalt in an aqueous solution containing all of those metals comprising:
    (a) adjusting the chloride content of said aqueous solution so that said solution contains at least 100 grams of chloride per liter;
    (b) adjusting the pH of said solution to no more than 1;
    (c) then contacting said solution with a water-immiscible secondary amine extractant to form an extract phase containing almost all said iron and zinc originally in said solution, and a raffinate phase containing almost all said nickel and cobalt in said solution; and
    (d) separating said phases from one another.
2. The process of claim 1 wherein said solution is adjusted to contain at least 150 grams of chloride per liter.
3. Process of claim 1 in which the molecular weight of the amine is from about 250 to 600.
4. Process of claim 1 in which the amine is N-dodecenyltrialkylmethylamine with average molecular weight of 372.
5. Process of claim 1 in which the nickel and cobalt-containing solution is the anolyte from electrolytic purification of nickel and cobalt.

References Cited

UNITED STATES PATENTS

| | | | |
|---|---|---|---|
| 1,409,727 | 3/1922 | Kardos | 204—112 |
| 2,384,300 | 9/1945 | Harford | 204—49 |
| 2,877,250 | 3/1959 | Brown et al. | 23—22 |
| 2,955,932 | 10/1960 | Goren | 23—312 |
| 3,128,156 | 4/1964 | Long et al. | 23—312 |
| 3,197,274 | 7/1965 | White | 23—312 |
| 3,304,246 | 1/1967 | Fukui et al. | 204—145 |

JOHN H. MACK, *Primary Examiner.*

H. M. FLOURNOY, *Assistant Examiner.*

U.S. Cl. X.R.

23—312; 204—114